Patented May 1, 1951

2,550,744

UNITED STATES PATENT OFFICE 2,550,744

HALOGEN DERIVATIVES OF TETRAHYDROPHTHALIC ACID AND PROCESSES FOR PRODUCING SAME

Richard S. Wilder, Elkins Park, and George D. Martin, Upper Darby, Pa., assignors to Publicker Industries Inc., a corporation of Pennsylvania No Drawing. Application July 17, 1945, Serial No. 605,626

2 Claims. (Cl. 260—341)

The present invention relates to certain new and useful halogen derivatives of tetrahydrophthalic acid and processes for producing the same.

An object of the present invention is to provide new and useful halogen derivatives of tetrahydrophthalic acid and processes for producing the same. Another object of the present invention is to provide certain new and useful halogen derivatives of tetrahydrophthalic anhydride and processes for producing the same. Still another object of the present invention is to provide new and useful synthetic resinous materials from halogen derivatives of tetrahydrophthalic acid.

Other objects and advantages of the present invention are apparent in the following detailed description and appended claims.

It has been known, for some time past, that tetrahydrophthalic acid will absorb bromine in a solution of an organic solvent (Chemical Abstracts, vol. 4, p. 3070, 1910) but the addition product has never been isolated or characterized. We have been unable to find any reference in the art as to the chlorination of tetrahydrophthalic acid or anhydride.

We have now found that when tetrahydrophthalic acid or anhydride is treated with bromine the bromine adds on at the double bond and forms a stable dibromo addition product which can readily be isolated in pure, crystalline form.

We have found, further, that when tetrahydrophthalic acid or anhydride is treated with chlorine at elevated temperature, hydrogen chloride is evolved and, instead of a dichloro addition product, a monochloro product is obtained, namely, monochlorotetrahydrophthalic acid (4-chloro-4-cyclohexene-1,2-dicarboxylic acid) or anhydride is obtained. In addition to this well-defined crystalline compound, a resin is obtained which contains chlorine and, apparently, is a polymer of the polyanhydride type.

We have found further that, under certain conditions, none of the crystalline monochlorotetrahydrophthalic acid is obtained; the resin product being formed in substantially quantitative yield.

We have also found that, upon heating of the crystalline monochlorotetrahydrophthalic acid, either alone or in an inert solvent, it is converted to a resinous product. Heating in the presence of hydrochloric or hydrobromic acid accelerates the conversion. When the dibromo addition product of tetrahydrophthalic acid is heated above its melting point it liberates hydrogen bromide and forms a dark-colored soft resin.

While we do not intend to be limited thereby, the following is our present theory as to the course of these several reactions.

Bromine adds to the double bond of tetrahydrophthalic acid to form a stable 4,5-dibromocyclohexane-1,2-dicarboxylic acid as follows:

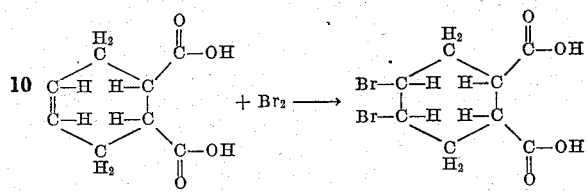

The dibromo addition product is relatively stable and evolves hydrogen bromide only when strongly heated.

Chlorine reacts in a similar manner but the addition product appears to be so unstable that it splits off one mole of hydrogen chloride very readily and forms 4-chloro-4-cyclohexene-1,2-dicarboxylic acid as follows:

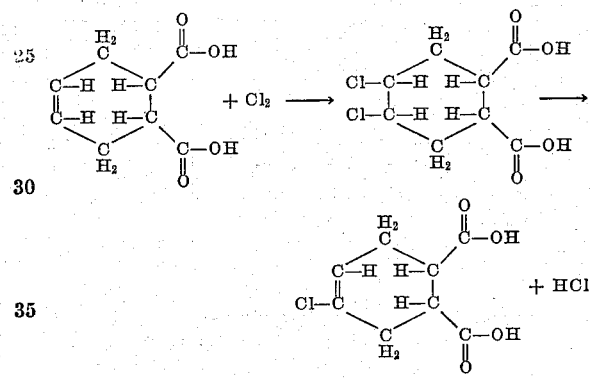

This crystalline acid melts at 173–176° C. and is identical to the compound formed by the Diels-Alder condensation of chloroprene and maleic anhydride (J. A. C. S., vol. 53, p. 4205). It may possibly be that this crystalline acid is the trans-isomer.

The filtrate obtained during isolation of the crystalline acid contains a highly soluble chloro compound which is, perhaps, the cis isomer which we have been unable to isolate in crystalline form, as yet, due to its high solubility and tendency to resinify.

Evaporation of a solution of this latter material first yields a soft, sticky resin which, upon removal of the remaining solvent by further heating, gives a product which is less soluble in water and in other solvents and which, when cooled, is hard, clear and glass-like. Presumably, this resinification is caused by the formation of polyanhydrides, since high water solubility of the product can be restored by boiling the slightly-soluble resin with dilute alkali and subsequently acidifying. Conversion of the crystalline acid to the same resinous product may be explained by isomerization of the trans to the cis form by heat and subsequent polyanhydride formation.

We have found that the presence of a chlorine atom in the 4-position of tetrahydrophthalic acid inhibits further halogenation (both chlorination and bromination) of the double bond.

We have found that the bromination or chlorination of tetrahydrophthalic acid or anhydride can be conducted with or without the aid of catalysts and over a wide range of temperatures. From a practical stand-point, we prefer to conduct the halogenations at temperatures ranging from about 0° C. to about 110° C.

In the halogenation of tetrahydrophthalic anhydride, the anhydride may be melted and treated with chlorine or bromine in the molten state or, instead, the anhydride may be suspended or dissolved in an inert solvent and, thereafter, halogenated.

In place of the halogen itself, a halogenating agent, such as sulfuryl chloride, may be employed.

Tetrahydrophthalic acid may be conveniently chlorinated in water. If the crystalline 4-chlorotetrahydrophthalic acid is desired as the chief product, elevated temperatures are avoided since heating, particularly in the presence of the evolved halogen acid, converts the material into the highly soluble resinous form.

The following are illustrative, but not restrictive, examples of the process of the present invention:

Example 1

152 parts of tetrahydrophthalic anhydride is mixed with 250 parts of glacial acetic acid and chlorine is passed into the agitated mixture; the reaction mixture being cooled to maintain the temperature at approximately 10 to 20° C.; a small amount of hydrogen chloride being liberated during the reaction. The chlorine addition is stopped when the weight of the reaction mixture has increased by approximately 66 parts.

Thereafter, the acetic acid is distilled off and, when the temperature of the residue has reached 160° C., the system is evacuated and the remaining acetic acid and hydrogen chloride are stripped out. During this stripping operation, a large volume of hydrogen chloride is evolved.

The residual product, amounting to approximately 106 parts, is obtained as a soft, very viscous, clear, light-amber colored resin. The product contains the theoretical amount of chlorine calculated as monochlorotetrahydrophthalic anhydride. This soft resinous product upon exposure to air, dries and hardens on the surface.

If the crude product obtained after distilling off the acetic acid is subjected to vacuum distillation at 5 mm. pressure, some viscous liquid distills over at 155 to 235° C. From this distillate, a small amount of crystalline material separates out and may be purified by re-crystallization from acetone. The crystalline product melts at 123–124° C. and, by analysis, has been shown to be 4-chloro-4-cyclohexene-1, 2-dicarboxylic anhydride. When the anhydride is hydrolyzed, the resulting acid has the same melting point as the monochlorotetrahydrophthalic acid obtained by condensation of chloroprene with maleic anhydride and subsequent re-crystallization (see J. A. C. S., vol. 53, p. 4205, 1931).

Example 2

76 parts of tetrahydrophthalic anhydride is mixed with 76 parts of water and chlorine is passed into the well-agitated slurry at 30–35° C. for about two hours, and until chlorine is no longer absorbed; the weight increase of the batch being about theoretical.

After standing for several hours, the crystalline product which has separated out is filtered off and washed with a little cool water. 103 parts of substantially pure monochlorotetrahydrophthalic acid is thus obtained; the acid, upon recrystallization from water being found to melt at 173°–175° C.

Example 3

76 parts of tetrahydrophthalic anhydride is mixed with 100 parts of water and the mixture is boiled to convert the anhydride to the acid. After cooling to 80° C., chlorine is passed into the solution at such a rate as to maintain the temperature at about 80° C. by the heat of reaction. When the weight of the mixture has increased approximately 36 parts (which usually is the case after chlorine has been run in for about an hour), the chlorine addition is stopped and the mixture is cooled to 25–30°.

After several hours, the crystalline product is filtered out and washed with a little cool water. About 67 parts of pure monochlorotetrahydrophthalic acid is thus obtained. The acid, which has a melting point of 173–175° C., contains approximately the theoretical (17.3%) amount of chlorine.

The aqueous filtrate obtained after filtering off the crystalline acid may be subjected to distillation, first at atmospheric pressure and later under vacuum at approximately 5 mm. until the temperature of the residual mass reaches 185° C. In this manner, 37 parts of a clear, light amber-colored, hard resin is obtained; the resin containing approximately 17.3% chlorine and being sparingly soluble in hot water.

Example 4

76 parts of tetrahydrophthalic anhydride is boiled with 100 parts of water until a clear solution is obtained. After cooling to 80° C., 36 parts of chlorine gas is passed into the solution at a rate just sufficient to maintain the temperature at about 80° C. The water and the hydrochloric acid are then distilled off, first at atmospheric pressure and thereafter under a vacuum of about 5 mm. until the temperature of the residue reaches about 185° C. The viscous residue solidifies, when cooled, to a hard, brittle, glass-like resin containing about the theoretical amount of chlorine, calculated as monochlorotetrahydrophthalic anhydride. The resin is sparingly soluble in water or alcohol but dissolves readily in hot dilute alkali solution.

Example 5

76 parts of tetrahydrophthalic anhydride is melted by heating at approximately 105° C. and 68 parts of sulfuryl chloride is run in slightly below the surface of the agitated liquid. When evolution of hydrogen chloride and sulfur dioxide has ceased, the melt is allowed to cool whereupon 94 parts of a clear amber-colored glassy resin is obtained. The product is essentially identical

Example 6

76 parts of tetrahydrophthalic anhydride is melted and the chlorine gas is passed into the liquid at a rate just sufficient to maintain the temperature above the melting point of the anhydride. Hydrogen chloride is evolved during the reaction and the temperature of the melt may be gradually lowered to about 70° C. When chlorination is complete, the resinous product may be heated under vacuum at 200° C. to distill off a small amount of acid chloride. The remaining residue is a glass-like resin, sparingly soluble in water. It dissolves in sodium carbonate solution and reprecipitates in resinous form when the solution is acidified. If, however, the alkaline solution is boiled for ten to fifteen minutes, the polyanhydride is hydrolyzed and no resin precipitates upon acidification.

Example 7

152 parts of tetrahydrophthalic anhydride is suspended in 700 parts of carbon tetrachloride and 75 parts of chlorine is passed into the mixture; the mixture being stirred and being maintained at about 30 to 38° C. The carbon tetrachloride and the hydrogen chloride are then distilled off and the viscous residue is heated to about 170° C. under vacuum. The resulting clear, viscous liquid solidifies, when cooled, to a hard resin, similar to the products described in the foregoing examples.

Example 8

Crystalline monochlorotetrahydrophthalic acid is heated at about 180° C. for fifteen minutes. The clear, viscous liquid thus formed solidifies, on cooling, to a hard brittle resin.

The monochlorotetrahydrophthalic acid has a melting point of 173–176° C. and is sparingly soluble in water but, by boiling the mixture, it goes into solution and no longer precipitates when the solution is cooled. By evaporating off the water, a soft viscous resin is obtained which, on further heating, is converted to a hard, clear resin. By addition of hydrochloric or acetic acid to the above mixture, the transformation is brought about more quickly.

Example 9

55 parts of tetrahydrophthalic anhydride is suspended in 100 parts of glacial acetic acid and 60 parts of bromine is slowly added while the mixture is stirred and is maintained at a temperature of about 25 to 30° C. The bromine is rapidly absorbed; the addition being complete in a few minutes. The crystalline product is filtered off and washed with ether. 87.5 parts of 4.5-dibromocyclohexane-1,2-dicarboxylic anhydride is obtained in the form of white crystals melting at 138–139° C. When recrystallized from toluene, the product melts at 138.5–139.5° C. By evaporation of the acetic acid filtrate to a small volume, about 25 parts additional of a less pure product is obtained. This anhydride may be converted to 4.5-dibromocyclohexane-1,2-dicarboxylic acid (melting point 220–221° C.) by dissolving it in alkali solution and precipitating with a mineral acid.

Example 10

39 parts of tetrahydrophthalic anhydride is boiled with 200 parts of water to hydrolyze the anhydride to acid. After the mixture is cooled to about 5° C., 40 parts of bromine is slowly added; the mixture being stirred and maintained at a temperature of 0–10° C. during the addition. The mixture is then stirred for an additional hour and filtered. The white crystalline product thus obtained is substantially pure 4.5-dibromocyclohexane-1,2-dicarboxylic acid, identical with the acid obtained in foregoing Example 9.

Example 11

38 parts of tetrahydrophthalic anhydride is mixed with 100 parts of benzene and 40 parts of bromine is added at 10–20° C. over a two hour period with stirring and cooling. When the bromine addition is complete, the temperature is allowed to rise to 25° C. and the crystalline product is filtered off and dried. 49.5 parts of 4.5-dibromocyclohexane-1,2 - dicarboxylic anhydride, having a melting point of 137–138° C. is obtained. By evaporation of the filtrate, a second crop of crystals can be obtained.

Example 12

A mixture of 38 parts of tetrahydrophthalic anhydride and 100 parts of benzene is heated to boiling and 40 parts of bromine are added while the mixture is refluxed. When the reaction is complete, about half of the benzene is distilled off and, after cooling to room temperature, the resulting crystalline magma is sucked dry on a vacuum filter. 58.5 parts of light-buff colored product having a melting point of 134–136° C. is thus obtained. By recrystallization from toluene, the pure 4.5-dibromocyclohexane-1,2-dicarboxylic anhydride can be obtained.

Example 13

The procedure of Example 12 is repeated using other inert organic solvents, such as carbon tetrachloride, tetrachloroethane, etc., in place of benzene. The results are generally comparable to those obtained in Example 12.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described our invention, we claim as new and desire to protect by Letters Patent:

1. A process of the character described which comprises mixing about 152 parts of tetrahydrophthalic anhydride with about 250 parts of glacial acetic acid and passing in chlorine with agitation at a temperature of about 10–20° C. until about 66 parts of chlorine has been absorbed, and heating the mixture to about 160° C. to distill off acetic acid.

2. A process of the character described which comprises mixing about 152 parts of tetrahydrophthalic anhydride with about 250 parts of glacial acetic acid and passing in chlorine with agitation at a temperature of about 10–20° C. until about 66 parts of chlorine has been absorbed, heating the mixture to about 160° C. to distill off acetic acid, thereafter subjecting the mixture to vacuum distillation at a pressure of about 5 mm. and a temperature of about 155–235° C., and recovering 4-chloro-4-cyclohexene-1,2-dicarboxylic anhydride from the distillate by crystallization.

RICHARD S. WILDER.
GEORGE D. MARTIN.

(References on following page)

REFERENCES CITED

The following references are of record in the file of this patent:

UNITED STATES PATENTS

| Number | Name | Date |
|---|---|---|
| 1,877,991 | Schwenk et al. | Sept. 20, 1932 |
| 1,891,843 | Shaw | Dec. 20, 1932 |
| 1,975,246 | Zwilgmeyer | Oct. 2, 1934 |
| 2,071,250 | Carothers | Feb. 16, 1937 |
| 2,208,321 | Bradley | July 16, 1940 |
| 2,342,173 | Wise et al. | Feb. 22, 1944 |

OTHER REFERENCES

Abati et al.: Gazz. Chim. ital., vol 38, II, pages 577–87 (1908), abstracted in C. A. vol. 4, page 3070.

Carothers et al.: J. Am. Chem. Soc., 53, pages 4203–5 (1931).

Ayling: J. Chem. Soc. (1929), pages 253–256.

Woodward et al.: J. Am. Chem. Soc. 63, 3167–71 (1941).

J. Am. Chem. Soc., 53, page 4205 (1931).